N. J. LINDSTROM.
NONSKID TIRE GRIP.
APPLICATION FILED AUG. 12, 1919.
1,417,186.
Patented May 23, 1922.
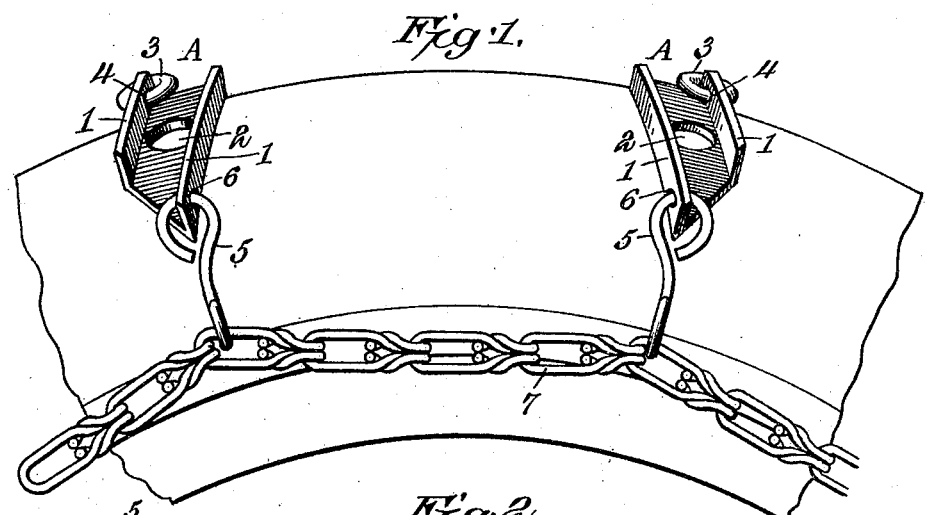
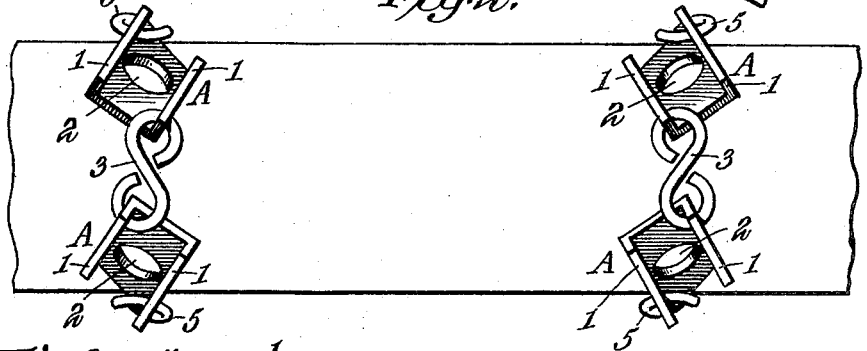
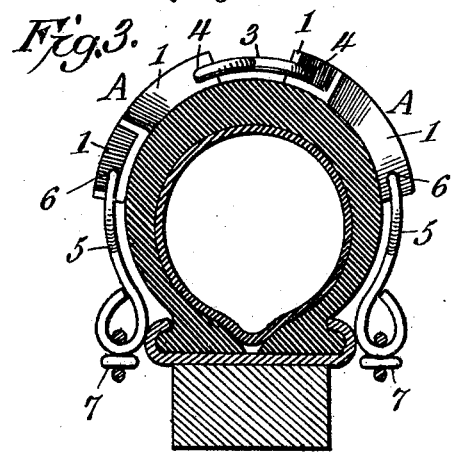
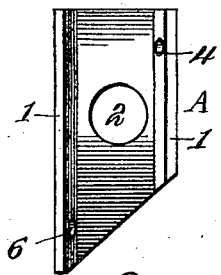

UNITED STATES PATENT OFFICE.

NILS J. LINDSTROM, OF EVANSVILLE, MINNESOTA.

NONSKID-TIRE GRIP.

1,417,186.　　　　　Specification of Letters Patent.　　Patented May 23, 1922.

Application filed August 12, 1919. Serial No. 316,951.

*To all whom it may concern:*

Be it known that I, NILS J. LINDSTROM, a citizen of the United States, residing at Evansville, in the county of Douglas and State of Minnesota, have invented certain new and useful Improvements in Nonskid-Tire Grips, of which the following is a specification.

My invention relates to an improvement in non-skid tire grips.

The object is to do away with the ordinary chain now used for this purpose and in its stead I propose to employ lugs of peculiar type extending in pairs around the tire at intervals and connected by an interposed link and having their ends linked to the side chains.

In the accompanying drawings,

Figure 1, is a view in side elevation of a section of tire showing my device applied, Figure 2, is a full size view of the device in plan, Figure 3, is a view in transverse section through a tire showing my improved device applied thereto, and Figure 4 is a plan view of one of the lugs.

The lugs A are preferably just alike and they are generally used in pairs and they consist of channel iron, that is, of a center and two side flanges 1, and one end is preferably cut off square and the other diagonally as shown in Figure 2, and in the center the hole 2, is formed for two main reasons, namely to take a better hold on the tire casing, and to prevent clogging.

Each lug has a general curve as shown in Figure 3, in the general shape of the tire.

An S-shaped link 3, connects the lugs in pairs, holes 4, being provided in the flanges 1, to receive the link, and hooks 5, extend through holes 6, in the longer flanges 1, and connect the lugs to the side chains 7, as shown in Figures 1, and 3.

The lugs A, are preferably made from carbon steel and tempered, and they are disposed as shown in Figure 2, in order to get the best results. Thus they extend diagonally and they automatically adjust themselves to keep the car from skidding and slipping.

My improved device will not injure the tire and it will effectually prevent accidents due to skidding. The lugs are so formed that they present a smooth and rounding surface to the tire surface, they being the only part of the device which comes in contact with the tire.

I claim:

1. A non-skid tire grip including a channel-iron lug having a diagonal end, whereby one of the flanges is of greater length than the other, side chains, and means extending from the side chains to the opposite corners of the lug.

2. A non-skid tire grip including two channel-iron lugs having curved backs to substantially conform to the surface of a tire, a link loosely connecting the corners of said lugs together and hooks extending from the diagonally-opposed corners of the lugs to the side chains.

3. A non-skid grip including side chains, channel-iron lugs having curved backs to substantially conform to the surface of a tire, said backs having holes therein, an S-shaped link connecting the corner of one lug loosely to the corner of another, and hooks extending from the diagonally opposed outer corners of lugs to the side chains.

4. A non-skid tire grip comprising lugs of channel iron form the side flanges of which are of different lengths and having at least one diagonal end and provided with a hole in the center and in each flange, a link connecting the shorter flanges together, hooks extending through holes in the longer flanges and side chains to which these hooks are connected.

5. A non-skid tire grip including circumferential side chains, short channel lugs and means for connecting them together in series and means connecting the series to the side chains so that the lugs lie diagonally and transversely across the tire with their sharp-ended flanges presented outwardly and the interposed lug connecting means approximately central of the wheel tread.

In testimony whereof I affix my signature.

NILS J. LINDSTROM.